March 17, 1942.  A. NAGY  2,276,789
APPARATUS FOR GRINDING DIAMONDS AND THE LIKE
Filed April 14, 1938  2 Sheets-Sheet 1

Inventor:
A. Nagy
By E. F. Wendroth
Atty

March 17, 1942.　　　A. NAGY　　　2,276,789
APPARATUS FOR GRINDING DIAMONDS AND THE LIKE Filed April 14, 1938　　　2 Sheets-Sheet 2

Inventor:
A. Nagy
By E. H. Wendroth
Atty

Patented Mar. 17, 1942

2,276,789

UNITED STATES PATENT OFFICE 2,276,789

APPARATUS FOR GRINDING DIAMONDS AND THE LIKE

Arpád Nagy, Turnov, Czechoslovakia

Application April 14, 1938, Serial No. 202,091
In Czechoslovakia February 3, 1938

6 Claims. (Cl. 51—229)

The invention relates to the grinding of diamonds and like articles.

Diamonds are usually ground in the shape of a low truncated pyramid, the top face of which forms the so-called table, and which possesses eight, sixteen or thirty-two side faces, the so-called facets, and which is put, with its bottom face, on an inverted pyramid, a so-called collet, which has eight, sixteen or thirty-two so-called bottom facets. The facets of the top and bottom pyramids touch each other at so-called rondists, the halves of the apex angle of the top pyramid usually measuring, for optical reasons, 44½° and the apex angle in the case of the bottom inverted pyramid usually measuring 41°. For the purpose of obtaining a correct refraction and reflection of rays, which are the decisive factors for the perfection of a stone, it is very important that the grinding of the stone should be quite accurate and regular.

Diamonds are ground on large, horizontal rotating discs, being held fast in holders. These holders are formed by sheet-metal cups which are about 3 cms. wide and are fixed on flexible wire. These cups are filled with a mass of solder which has approximately the shape of a cone in the apex of which the diamond to be ground is fixed by melting the solder material. In the grinding, the holder is gripped in a pair of pliers by means of its wire and is then placed with the diamond on the grinding disc on which the grinding takes place. In the grinding, care must be taken that the grinding takes place in accordance with the structure of the diamond. The necessary inclination and position of the diamond are obtained by correspondingly bending the wire of the holder. After a facet of the top pyramid has been ground (the table is usually produced on the diamond by cutting and therefore does not have to be ground), the diamond is removed by melting the solder material and is again fixed in another position by melting the solder material for example, for the opposite facet. By proceeding in this way, the whole diamond is finally ground. The angles and the positions of the individual facets are, in the case of small diamonds, entirely determined by estimation by means of the eye and, in the case of larger diamonds, they are controlled by means of patterns.

As can be seen, the whole process is extremely laborious, depends entirely upon the skill of the grinder and is also very tedious.

All these disadvantages are obviated by the apparatus according to the invention in which the diamond is gripped in a holder, it being possible to rock the holder in desired directions and to rotate the diamond through the desired angle for grinding the individual facets.

An example of the apparatus according to the invention is represented by the accompanying drawings, of which Figure 1 represents a completely ground diamond;

Figure 2:
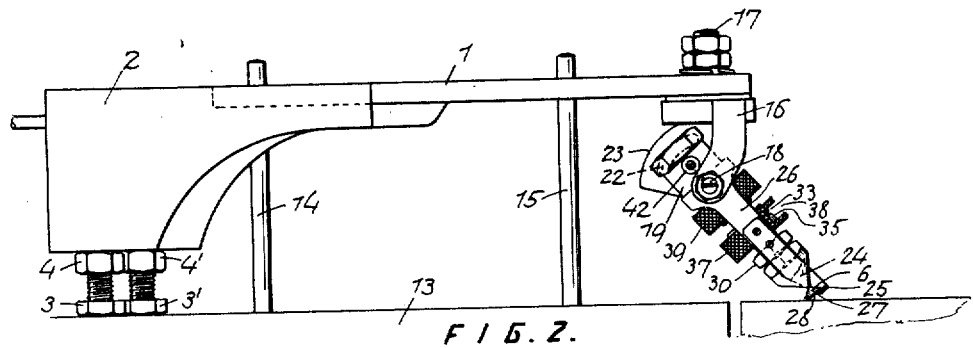
Figure 2 represents the apparatus in front elevation.
Figure 3:
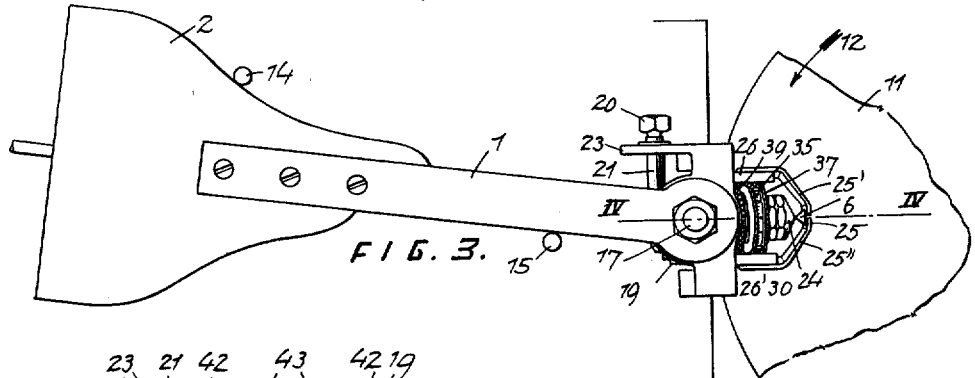
Figure 3 represents the apparatus in plan.

As can be seen from Figures 2 and 3, the apparatus according to the invention consists of the fixing head proper which is mounted at the end of an arm 1. The other end of the arm 1 is fixed in a body 2 which has on its underside two legs the height of which is adjustable. These legs are, in the example shown, formed by screws 3 and 3' which are screwed into screw-threaded apertures in the body 2 and are secured in the adjusted positions by means of securing nuts 4 and 4'. By adjusting the screws 3 and 3', the apparatus is kept in the horizontal position on changes of height of the third leg that is formed by the fixing head. The height of the fixing head alters with different inclinations of the fixing device 19 with the diamond 6.

Figure 1:
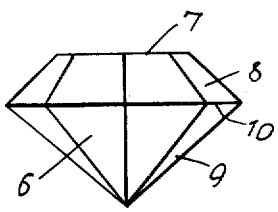

The completely ground diamond is represented in its simplest form in Figure 1. 7 denotes the table, 8 the top part, 9 the bottom collet and 10 the rondists.

On grinding, the diamond lies on an horizontal grinding disc 11. The grinding disc revolves in the direction of the arrow 12, whilst the other two legs of the apparatus rest on a fixed base 13 on which the apparatus is supported between pins 14 and 15. In this way, the apparatus is well held, but, notwithstanding this, it can easily be removed for the purpose of checking the operation of grinding the particular facet being produced.

The fixing head consists of a stirrup 16 which is mounted at the end of the arm 1 so as to be rotatable about a vertical pin 17. Arranged in the arms of the stirrup 16 are points 18 and 18' which are opposite to each other and on which the fixing device proper 19 is mounted so as to be rockable about an horizontal axis.

The fixing device 19 can be held fast in the adjusted oblique position by means of a screw nut 20 that is arranged on a screw 21. The screw 21 is fixed on the fixing device and passes through an arcuate opening 22 in a flat part 23 of an arm of the stirrup.

The diamond 6 is fixed in the fixing device between a support 24, which is axially displaceable and is, in addition, rotatable to an exact degree (as will hereinafter be described) and a transverse support 25. The transverse support 25 is formed by two powerful springs 25' and 25" which are fixed on the arms 26 and 26' of the fixing device and the ends of which are pressed towards each other by spring force. The support 24 (which will hereinafter be termed pressing support) and the transverse support 25 are arranged in such a manner that the centre of the bottom edge of the transverse support 25, which faces the grinding disc 11, lies in the extension of the axis of the point of the pressing support 24. At this centre point, the springs 25' and 25", which form the transverse support, also touch each other, the bottom edge of the transverse support being, for the purpose of rendering possible the grinding of small diamonds also, bevelled in such a manner that, on obliquely positioning the fixing device at the angle mostly employed, the surface 27 comes to lie horizontally. The edge of the transverse support 25, against which the diamond 6 is supported, runs out into a knife edge 28.

It can be seen that, by inclining the fixing device 19 about the points 18 and 18', the correct inclination, in relation to the axis of the diamond, of the facet to be ground, which inclination is ordinarily 44½° and 41°, can be adjusted.

By rotating the head about the vertical pin 17, the diamond is adjusted in such a manner that its structure lines always lie in the direction of grinding.

The pressing support has the shape of a cone or the like the base of which is in the form of a screw nut which is screwed, by means of its screw thread, on a screw 29. By means of the securing nut 30, the support 24 is held fast in its adjusted position on the screw 29 and is, at the same time, firmly connected therewith. The screw 29, at the end that projects from the screw nut, becomes a smooth cylinder 31 which is mounted in a correspondingly hollow space 32 in a further thicker screw 33. For the purpose of preventing the cylinder 31 from falling out or from being unintentionally rotated, there is arranged in the cylinder a ball 34 which rests against the wall of the hollow space 32 and is pressed outwards elastically. Between the screw-threaded part and the smooth part of the screw 29, there is arranged on the latter a ring 35 on the periphery of which there is a scale which has, for example, 32 divisions. The rotation of the screw 29 about its axis is read off on this scale by means of a mark 36 on the edge of the other screw 33. The screw 33 is axially displaceable and it can be seen that, after drawing this screw in backwards by means of the screw 29, the diamond, which is held fast in the pressing support, can be rotated through any desired amount—e. g., through 1/32 of the periphery—for the purpose of grinding a further facet. After being rotated through the desired angle, the diamond 6 is pressed to the transverse support by the axial movement of the screw 33 and the further facet is ground.

For the purpose of preventing rotation of the screw 29 with the diamond during grinding, for which purpose the ball 34 is not sufficient, there is put over the screw 29 and its ring 35 a cap nut 37 which is screwed on the screw thread arranged on one end of the screw 33. The screw nut 37 has an opening 38 through which the scale on the ring 35 can be observed. By tightening the screw nut 37, the ring 35 is pressed against the end of the screw 33, so that the screw 29 is fixed in the adjusted position. Before rotating the screw 29 for the purpose of grinding a further facet, the screw nut 37 must naturally again be loosened.

For the purpose of axially moving the screw 33, there is rotatably mounted at the base of the fixing device 19 a screw nut 39 the axial movement of which is prevented by a screw 40 which engages in an annular recess 41 in the screw nut 39. The screw nuts 37 and 39 are milled on their peripheries in order that they may be capable of being rotated by hand. The rotation of the screw 33 on the rotation of the screw nut 39 is prevented by pins 42 which engage in axial grooves 43 that are arranged in the smooth end part of the screw. By means of this end part, the screw 33 is guided in the base of the fixing device on its axial movement in the cylindrical hollow space.

The grinding of the diamond by means of the apparatus described is effected as follows:

The diamond 6 is held fast at the end of the pressing support 24 and is pressed with its table to the transverse support 25 by rotating the screw nut 39. The division mark, which the pointer indicates on the scale of the ring 35, is ascertained. The apex angle of the facets to be ground is adjusted by rotating the fixing device 19 about the points 18 and 18' and tightening the screw nut 20. The horizontal position of the arm 1 is then produced by means of the screws 3 and 3'. The diamond 6 is then adjusted with its structure lines in the direction of grinding by rotating the stirrup 16 and the apparatus with the diamond is placed on the disc 11. During the grinding, the apparatus is periodically raised and the size of the facet produced is checked by inspection. After the desired size is obtained, the apparatus is lifted off and the fixing of the diamond is loosened by rotating the screw nut 39 back, whereupon the ring 35 is released by rotating the screw nut 37 and the screw 29 is rotated through the desired division—e. g., through 1/32 or, if the opposite facet is to be ground, through ½, the screw nut 37 is tightened and the diamond is again fixed in by means of the screw nut 39. The further facet is then ground, if required, after the necessary amount of rotation of the stirrup 16, and so on until all the facets round the table have been completely ground. Thereupon, the diamond is reversed and the collet is ground in a corresponding manner.

Figure 4:
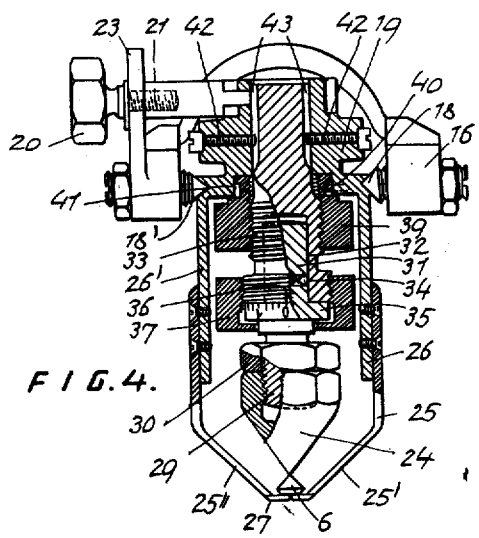
Figure 4 is a section through the head of the apparatus on the line IV—IV of Figure 3.
Figure 5:
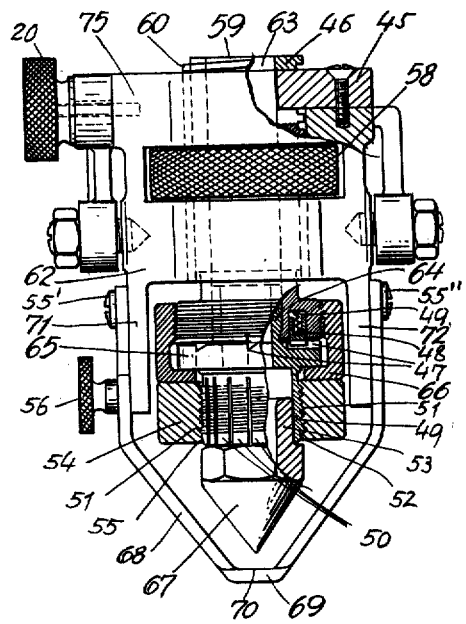
Figure 5 shows a front elevational view with parts in section of a modified construction.
Figure 6:
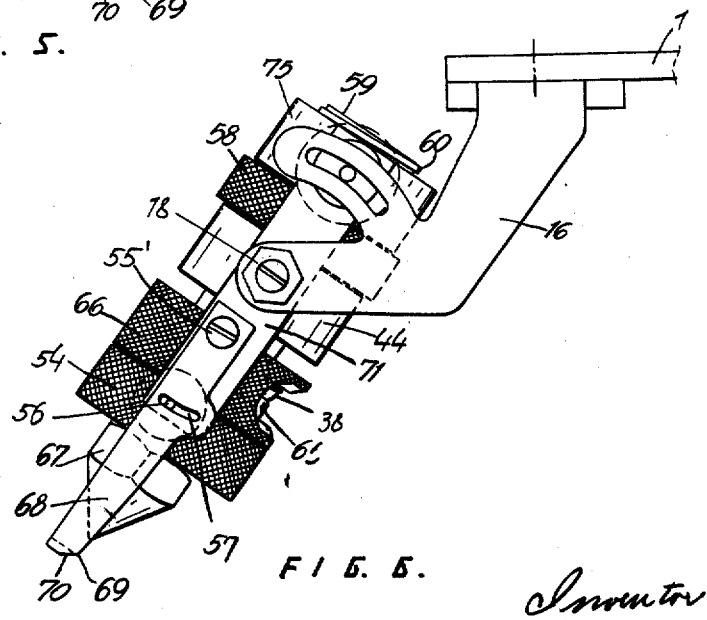
Figure 6 shows a side elevational view of the construction shown in Figure 5.

In Figures 5 and 6, the parts which are constructed like those of the apparatus shown in Figures 2 to 4 are denoted by the same reference numerals.

In the construction according to Figures 5 and 6, the screw nut 58, which, by its rotation, produces the axial movement of the screw 59, is mounted between the base of the fixing device 75 and its transverse ledge 62, so that its axial immobility is obtained directly. The screw 59 is, in its entire length, provided with a flat screw thread 60, the flat apex parts of which fit tightly into the bore in the base of the fixing device 75 and its transverse ledge 62. In this way, a more reliable axial guiding of the screw 59 than in the case of the construction according to Figures 2 to 4 is obtained, since the screw 59 is guided both above the screw nut 58 and below it. The axial hollow space 63 of the screw 59 is continuous and the rotation of the screw is prevented by means of a pin or block 45 which is tightly screwed to the base of the fixing device 75 and, by means of its inner end, engages in an axial opening 46 which is arranged on one side of the inner end of the screw 59.

In the construction according to Figures 5 and 6, the cylinder 64 is hollow and the inside of its ring 65 is provided with 8, or, if required, with another number of radially extending notches on one side which, on the rotation of the cylinder 64 in the hollow space 63 of the screw 59, cooperate with a pin 48 which is axially displaceable and is elastically mounted in a bore 49 in the under part of screw 59. On rotating the cylinder 64, the ring 65 of which is held by the cap nut 66 threaded on screw 59, the projecting end of the pin 48 snaps into the notches 47, so that the angle of rotation is, at the time being, fixed at ⅛ or, if required, at some other part of a revolution. In this way, an easier rotation of the diamond for the purpose of grinding its individual facets is obtained. In the case of this arrangement, the fixed position of the cylinder 64 and of the parts connected therewith is ensured even if the cap nut 66 is incompletely tightened.

The outer end of the cylinder 64 is in the form of a piece of tubing 49' which is provided with axial openings so that it consists of axial tongues 50 which are elastic to a certain extent. In addition, the piece of tubing is provided on the outside with a screw thread 51 and its end has a conical surface 52 on the outer side. Into this piece of tubing there is inserted the inner end of the pressing support 67 which is in the form of a hollow cylinder 53. On the screw thread 51 there is screwed a screw nut 54 the screw thread of which is provided at one end with a concave conical surface 55 which, on tightening the screw nut 54, bears against the conical surface 52 of the end parts of the tongues 50, so that the latter are pressed radially towards the centre and grip the cylindrical inner end 53 of the pressing support 67. In this way, an easy adjustability and exchangeability of the pressing support 67 is rendered possible. The transverse support 68 is, in the construction according to Figures 5 and 6, formed by a stirrup which is made in one piece and which has the same shape as the springs 25' and 25'' as well as the ground face 69 and knife edge 70. The arms of the stirrup are mounted on the arms 71 and 72 of the fixing device preferably so as to be rockable about screws 55' and 55'', the rocking of the stirrup being limited by means of a screw 56 which passes through an opening 57 (Figure 6) arranged in an arm of the stirrup 68. The stirrup 68 is held fast in the adjusted position by means of the head of the screw 56 that is screwed into the arm 71. The rockability of the stirrup enables it to be removed from the working position on inserting the diamond or the like and thus increases the accessibility to the apparatus.

As can be seen, the apparatus according to the invention renders possible an absolutely exact, simple and rapid grinding of diamonds; this means a considerable advance as compared with the grinding process hitherto employed.

What I claim is:

1. An apparatus for grinding precious stones and the like comprising a universally mounted fixing member, a transverse support pivotally mounted upon said fixing member, said fixing member having a smooth bore extending longitudinally therethrough, a threaded bolt positioned in said bore, a nut threaded upon said bolt located within a recess in said fixing member for reciprocating said bolt within said bore, said bolt having a longitudinally extending recess therein, a cylindrical member positioned within said recess, said cylindrical member having a resilient threaded portion at one end thereof, a pressing support slidably mounted within said cylindrical member and means for contracting the resilient portion of said cylindrical member upon said pressing support to hold the same in fixed relation to said cylindrical member.

2. An apparatus for grinding precious stones and the like comprising a universally mounted fixing member, a transverse support pivotally mounted upon said fixing member, said fixing member having a smooth bore extending longitudinally therethrough, a threaded bolt positioned in said bore, a nut threaded upon said bolt located within a recess in said fixed member for reciprocating said bolt within said bore, said bolt having a longitudinally extending recess therein, a cylindrical member positioned within said recess, said cylindrical member having a resilient threaded portion at one end thereof, a pressing support slidably mounted within said cylindrical member and means for contracting the resilient portion of said cylindrical member upon said pressing support to hold the same in fixed relation to said cylindrical member, a collar upon said cylindrical member having notches therein at predetermined intervals and a resiliently mounted pawl carried by said bolt for cooperating with said notches.

3. An apparatus for grinding precious stones and the like comprising a universally mounted fixing member, a transverse support pivotally mounted upon said fixing member, said fixing member having a smooth bore extending longitudinally therethrough, a threaded bolt positioned in said bore, a nut threaded upon said bolt located within a recess in said fixing member for reciprocating said bolt within said bore, said bolt having a longitudinally extending recess therein, a cylindrical member positioned within said recess, said cylindrical member having a resilient threaded portion at one end thereof, a pressing support slidably mounted within said cylindrical member and means for contracting the resilient portion of said cylindrical member upon said pressing support to hold the same in fixed relation to said cylindrical member, and means for locking said cylindrical member to said bolt.

4. An apparatus for grinding precious stones and the like comprising a universally mounted fixing member, a transverse support pivotally mounted upon said fixing member, said fixing member having a smooth bore extending longitudinally therethrough, a threaded bolt positioned in said bore, a nut threaded upon said bolt located within a recess in said fixing member for reciprocating said bolt within said bore, said bolt having a longitudinally extending recess therein, a cylindrical member positioned within said recess, said cylindrical member having a resilient threaded portion at one end thereof, a pressing support slidably mounted within said cylindrical member and means for contracting the resilient portion of said cylindrical member upon said pressing support to hold the same in fixed relation to said cylindrical member, and means for locking said pivotable transverse support at predetermined positions.

5. An apparatus for grinding precious stones and the like comprising a fixing member, a pressing support mounted upon said fixing member, a transverse support also mounted upon said fixing member for pivotal movement about an axis at right angles to the longitudinal axis of the pressing support and adapted to cooperate with said pressing support and said transverse support being beveled and having a knife edge for engaging and supporting the end of the stone.

6. An apparatus for grinding precious stones and the like comprising a universally mounted fixing member, said member having a longitudinal bore extending therethrough, a bolt located in said bore having a recess therein, a second bolt positioned in said recess having a resilient portion at one end thereof, a pressing support mounted in said second bolt at said resilient end and cam means for contracting said resilient end so as to lock said pressing support to said second bolt.

ARPÁD NAGY.